United States Patent
Lonski et al.

(10) Patent No.: US 10,796,508 B2
(45) Date of Patent: Oct. 6, 2020

(54) AUTOMATED LOGGING OF AIRCRAFT OOOI TIMES USING MOBILE DEVICE

(71) Applicant: The Boeing Company, Chicago, IL (US)

(72) Inventors: Thomas Edward Lonski, Highlands Ranch, CO (US); Matthew J. Ardrey, Littleton, CO (US); William Paul Best, Parker, CO (US)

(73) Assignee: The Boeing Company, Chicago, IL (US)

( * ) Notice: Subject to any disclaimer, the term of this patent is extended or adjusted under 35 U.S.C. 154(b) by 510 days.

(21) Appl. No.: 15/598,874

(22) Filed: May 18, 2017

(65) Prior Publication Data

US 2018/0336743 A1 Nov. 22, 2018

(51) Int. Cl.
*G07C 5/08* (2006.01)
*G07C 5/10* (2006.01)
(Continued)

(52) U.S. Cl.
CPC .......... *G07C 5/085* (2013.01); *G01S 5/0018* (2013.01); *G01S 5/0027* (2013.01); *G01S 19/48* (2013.01); *G06Q 10/0833* (2013.01); *G07C 5/10* (2013.01)

(58) Field of Classification Search
None
See application file for complete search history.

(56) References Cited

U.S. PATENT DOCUMENTS 5,815,407 A * 9/1998 Huffman ............... B64C 27/006
244/183

6,308,044 B1 10/2001 Wright et al.
(Continued)

FOREIGN PATENT DOCUMENTS

EP 2284563 A1 2/2011
WO WO-03052534 A1 * 6/2003 ............. B64D 43/00

OTHER PUBLICATIONS

Summons to Oral Proceedings dated Jul. 17, 2019 in European Patent Application No. 18163047.6 (European counterpart of the instant patent application).
(Continued)

*Primary Examiner* — Todd Melton
*Assistant Examiner* — Jason R Roberson
(74) *Attorney, Agent, or Firm* — Ostrager Chong Flaherty & Broitman P.C.

(57) ABSTRACT

Devices and methods for providing a retrievable record of the times of the actual aircraft movements such as the Gate Out time when the aircraft leaves the gate or parking position, the Wheels Off time when the aircraft takes off, the Wheels On time when the aircraft touches down during landing, and the Gate In time when the aircraft arrives at the gate or parking position (OOOI times). A mobile device for logging data onboard an aircraft comprises: a motion sensor; a clock; a non-transitory tangible computer-readable storage medium for storing motion data from the motion sensor and associated time data from the clock; and a data processing system configured to identify stored motion data representing respective acceleration/deceleration vectors of the mobile device motions that correspond to aircraft gate departure and arrival and aircraft takeoff and landing. The OOOI times are automatically logged in the non-transitory tangible computer-readable storage medium.

15 Claims, 6 Drawing Sheets

(51) Int. Cl.
    *G01S 5/00*           (2006.01)
    *G06Q 10/08*         (2012.01)
    *G01S 19/48*         (2010.01)

(56)           References Cited

U.S. PATENT DOCUMENTS

| | | |
|---|---|---|
| 7,908,042 B2 | 3/2011 | Brinkley et al. |
| 8,825,234 B2 | 9/2014 | Williams et al. |
| 9,613,537 B2 | 4/2017 | Meserole, Jr. et al. |
| 2007/0142980 A1* | 6/2007 | Ausman .................. G01D 7/00 701/3 |
| 2011/0047112 A1* | 2/2011 | Ketabdar .............. G01S 5/0018 706/20 |
| 2013/0060514 A1 | 3/2013 | Burke |
| 2014/0064042 A1* | 3/2014 | Rustenberg ............. G04F 8/006 368/110 |

OTHER PUBLICATIONS

Gurkan et al., "Wireless 3-Axis Accelerometer System for Measurement of Structural Displacement," IEEE Conf. Publication, Nov. 30, 2013.

European Search Report dated May 24, 2018 in European Patent Application No. 18163047.6 (European counterpart of the instant patent application).

Examination Report dated Jul. 6, 2018 in European Patent Application No. 18163047.6 (European counterpart of the instant patent application).

* cited by examiner

AUTOMATED LOGGING OF AIRCRAFT OOOI TIMES USING MOBILE DEVICE

BACKGROUND

This disclosure relates to devices and methods for providing a retrievable record of the "Gate Out", "Wheels Off", "Wheels On" and "Gate In" times (hereinafter "OOOI data") of an aircraft.

As used herein, the term "OOOI data" refers to times of the actual aircraft movements of Gate Out, Wheels Off, Wheels On, and Gate In. The Gate Out time indicates when the aircraft leaves the gate or parking position. The Wheels Off time indicates when the aircraft takes off. The Wheels On time indicates when the aircraft touches down. The Gate In time indicates when the aircraft arrives at the gate or parking position.

OOOI data captured post-flight is among the most indispensable data for any flight operations organization. For example, the block time, which equals the Gate In time minus the Gate Out time, is used to measure aircraft utilization and is the basis for pilot duty times. In addition, the flight time, which equals the Wheels On time minus the Wheels Off time, is the basis for maintenance operations.

Currently, some airlines require their flight crews to record OOOI times by hand on a per flight basis. The flight crew then verbally relays the "Gate Out" and "Wheels Off" times after departure to ground-based dispatch operations via a VHF transceiver. Upon arrival, the flight crew hand delivers the written "Wheels On" and "Gate In" times to a gate agent. It would be desirable to eliminate the need for flight crews to manually record OOOI times, thereby reducing crew workload.

Other airlines use an Aircraft Communications Addressing and Reporting System (ACARS) Management Unit (MU) and VHF transceiver to automatically forward OOOI times to their ground-based dispatch operations. The ACARS is a digital datalink system for transmission of short messages between aircraft and ground stations via airband radio or satellite. A major function of ACARS is to automatically detect and report the start of each major flight phase, called OOOI events in the industry (out of the gate, off the ground, on the ground, and into the gate). These OOOI events are detected using input from aircraft sensors mounted on doors, parking brakes, and struts. At the start of each flight phase, an ACARS message is transmitted to the ground describing the flight phase, the time at which it occurred, and other related information such as the amount of fuel on board or the flight origin and destination. These messages are used to track the status of aircraft and crews.

In ACARS-equipped aircraft, most OOOI times are detected and transmitted automatically by sensors (such as doors, parking brakes, and strut switch sensors). ACARS defines the Gate Out time as the moment when all passenger and cargo doors are closed and the parking brake is released. ACARS defines the Wheels Off time as the moment when the air/ground sensor on the landing gear is set to the "airborne" state, i.e., the moment when the aircraft wheels leave the runway. ACARS defines the Wheels On time as the moment when the air/ground sensor on the landing gear is set to the "ground" state, i.e., the moment when the aircraft wheels come into contact with the runway. ACARS defines the Gate In time as the moment when the parking brake is set, i.e., applied.

Using aircraft sensor data is problematic because it can be difficult to capture and often has inaccuracies. Also aircraft in a mixed fleet will have different types of sensors, which causes automated collection to be problematic and inconsistent.

It would be desirable to provide a device and an automated method for collecting OOOI data which is more accurate and efficient than current manual or automated methods.

SUMMARY

The subject matter disclosed in detail below is directed to devices and methods for providing a retrievable record of the OOOI times of aircraft movements. The method uses motion sensor data from a mobile device located onboard the aircraft. In accordance with one embodiment, the mobile device comprises motion sensors, location sensors, a clock, a non-transitory tangible computer-readable storage medium for storing motion data from the motion sensors and associated time data from the clock, and a data processing system configured to identify stored motion data representing respective acceleration/deceleration vectors of the mobile device motions that correspond to the OOOI events for a flight of the aircraft, namely, aircraft gate departure and arrival and aircraft takeoff and landing. The associated OOOI times are automatically stored in the non-transitory tangible computer-readable storage medium. (As used herein, the verbs "store" and "log" are used interchangeably and synonymously to mean "keep or make a record".)

One aspect of the subject matter disclosed in detail below is a method for logging data onboard an aircraft, comprising: outputting motion data from a motion sensor; outputting time data from a clock representing times; storing the motion data from the motion sensor and associated time data from the clock in a non-transitory tangible computer-readable storage medium; processing the data to identify motion data representing a horizontal acceleration vector that corresponds to aircraft gate departure; identifying time data representing a begin time of the horizontal acceleration vector; setting a Gate Out time to be equal to the begin time; and storing data representing the Gate Out time in the non-transitory tangible computer-readable storage medium.

The method described in the preceding paragraph may further comprise: processing the data to identify motion data representing a horizontal deceleration vector that corresponds to aircraft gate arrival; identifying time data representing an end time of the horizontal deceleration vector; setting a Gate In time to be equal to the end time; and storing data representing the Gate In time in the non-transitory tangible computer-readable storage medium. Optionally, if location sensor data is available, the location sensor data can be used to improve the accuracy or efficiency of this method.

Another aspect of the subject matter disclosed in detail below is a system for logging data onboard an aircraft, comprising: a motion sensor configured to output motion data; a clock that outputs time data representing times; a non-transitory tangible computer-readable storage medium for storing motion data from the motion sensor and associated time data from the clock; and a data processing system configured to perform the following operations: identifying stored motion data representing a horizontal acceleration vector that corresponds to aircraft gate departure; identifying stored time data representing a begin time of the horizontal acceleration vector; setting a Gate Out time to be equal to the begin time; and sending data representing the Gate Out time to the non-transitory tangible computer-readable storage medium for storage. The data processing system may be further configured to perform the following operations:

identifying stored motion data representing a horizontal deceleration vector that corresponds to aircraft gate arrival; identifying stored time data representing an end time of the horizontal deceleration vector; setting a Gate In time to be equal to the end time; and sending data representing the Gate In time to the non-transitory tangible computer-readable storage medium for storage. The system further comprises a display screen, wherein the data processing system is further configured to control the display screen to display symbology representing the Gate In time and the Gate Out time.

A further aspect of the subject matter disclosed in detail below is a method for logging data onboard an aircraft, comprising: outputting motion data from a motion sensor; outputting time data from a clock representing times; storing the motion data from the motion sensor and associated time data from the clock in a non-transitory tangible computer-readable storage medium; processing the data to identify motion data representing an upward vertical acceleration vector that corresponds to aircraft takeoff; identifying time data representing a begin time of the upward vertical acceleration vector; setting a Wheels Off time to be equal to the begin time; and storing data representing the Wheels Off time in the non-transitory tangible computer-readable storage medium.

The method described in the preceding paragraph may further comprise: processing the data to identify motion data representing a downward vertical deceleration vector that corresponds to aircraft landing; identifying time data representing an end time of the downward vertical deceleration vector; setting a Wheels On time to be equal to the end time; and storing data representing the Wheels On time in the non-transitory tangible computer-readable storage medium. Optionally, if location sensor data is available, the location sensor data can be used to improve the accuracy or efficiency of this method.

In accordance with some embodiments of the above-described method for logging the Wheels Off time, the processing step comprises: calculating a magnitude of an upward vertical displacement subsequent to the begin time of the upward vertical acceleration vector; determining that the magnitude of the upward vertical displacement exceeds a specified vertical displacement threshold; calculating a groundspeed of the aircraft subsequent to the begin time of the upward vertical acceleration vector; and determining that the calculated groundspeed of the aircraft device exceeds a specified groundspeed threshold.

Yet another aspect is a system for logging data onboard an aircraft, comprising: a motion sensor configured to output motion data; a clock that outputs time data representing times; a non-transitory tangible computer-readable storage medium for storing motion data from the motion sensor and associated time data from the clock; and a data processing system configured to perform the following operations: identifying stored motion data representing an upward vertical acceleration vector that corresponds to aircraft takeoff; identifying stored time data representing a begin time of the upward vertical acceleration vector; setting a Wheels Off time to be equal to the begin time; and sending data representing the Wheels Off time to the non-transitory tangible computer-readable storage medium for storage. The data processing system may be further configured to perform the following operations: identifying stored motion data representing a downward vertical deceleration vector that corresponds to aircraft landing; identifying time data representing an end time of the downward vertical deceleration vector; setting a Wheels On time to be equal to the end time; and sending data representing the Wheels On time to the non-transitory tangible computer-readable storage medium for storage. The system further comprises a display screen, wherein the data processing system is further configured to control the display screen to display symbology representing the Wheels Off time and the Wheels On time.

Other aspects of systems and methods for logging OOOI times are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
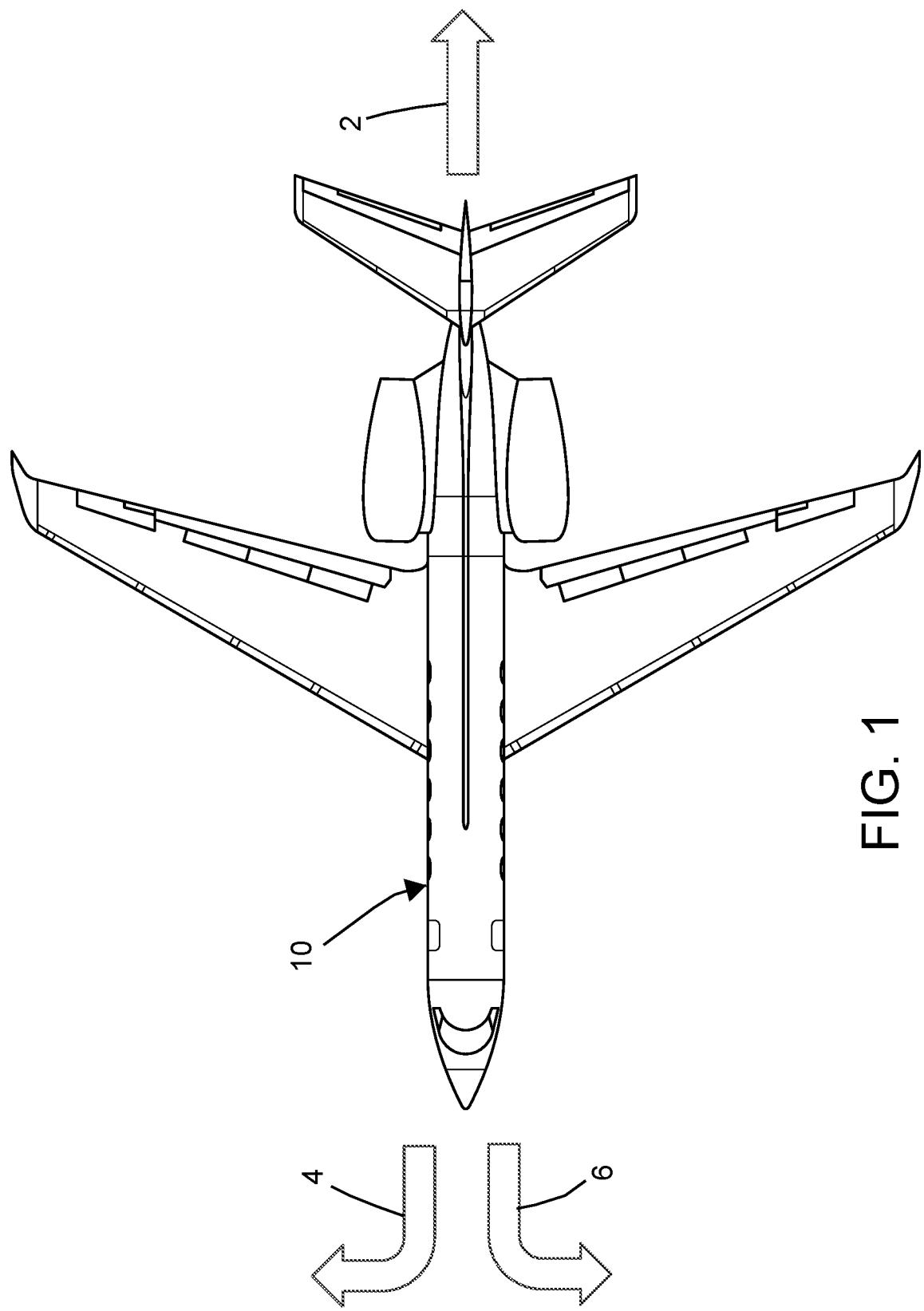
FIG. 1 is a diagram representing a top view of an aircraft having alternative possible Gate Out movements (indicated by arrows).

Illustrative embodiments of a mobile device for automated logging of OOOI data are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The design disclosed herein uses a mobile device's motion sensor data and not GPS data. Mobile devices typically do not have a good GPS signal inside an aircraft without the use of an external antenna. The use of an external antenna or GPS may not receive regulatory approval. In, addition the design disclosed herein does not require integration with aircraft avionics. Avionics can provide additional data such as GPS or Hobbs times. The design disclosed herein enables use in early-generation aircraft that lack interconnectivity. The design can take advantage of additional data when available.

The methods disclosed herein use motion sensor data from a mobile device located onboard the aircraft. In accordance with one embodiment, the mobile device comprises motion sensors, location sensors, a clock, a non-transitory tangible computer-readable storage medium for storing motion data from the motion sensor and associated time data from the clock, and a data processing system configured to identify stored motion data representing respective acceleration/deceleration vectors of the mobile device motions that correspond to the OOOI events for a flight of the aircraft, namely, aircraft gate departure and arrival and aircraft takeoff and landing. More specifically, the mobile device comprises a processor that executes application logic in the form of a set of algorithms for automatically detecting and storing (i.e., logging) respective OOOI times in the non-transitory tangible computer-readable storage medium.

In accordance with one exemplary application, the OOOI-data-logging mobile device receives flight plan information. Flight plan information may come from ground computer systems or from the flight management computer onboard the aircraft. The received flight plan information includes departure and arrival times and sunrise and/or sunset times for a flight. In addition, the OOOI-data-logging mobile device receives default taxi times from an operator to improve algorithm accuracy. Optionally, the OOOI-data-logging application can be configured to receive data from other applications hosted on the mobile device or from the aircraft avionics.

In accordance with one embodiment, the application runs continuously on the mobile device (foreground or background). Pilots are typically in the cockpit 30 minutes before departure. The application can either automatically or manually begin logging motion sensor data. In an exemplary automatic mode, the application may begin logging 60 minutes prior to the departure time from the flight plan. This 60-minute buffer may be configurable. In a manual mode, the pilot may manually activate the application, which starts the logging and also indicates when the pilot is in the cockpit. Data is logged until the application is used for post-flight functions. This ensures that all necessary data is logged regardless of delays or the timing of the pilot's use of the application to capture post-flight information. Multiple logs can be maintained as needed if the post-flight phase is not done before the next flight.

In accordance with some embodiments, a mobile device for logging OOOI data onboard an aircraft comprises: motion sensors configured to output motion data representing motions of the mobile device; a clock configured to output time data representing times; a non-transitory tangible computer-readable storage medium for storing motion data from the motion sensor and associated time data from the clock; and a data processing system configured to identify stored motion data representing respective acceleration/deceleration vectors for mobile device motions that correspond to the OOOI events, namely, aircraft gate departure, aircraft takeoff, aircraft landing, and aircraft gate arrival. In accordance with one implementation, the motion sensor may comprise a first accelerometer for detecting acceleration in an X direction, a second accelerometer for detecting acceleration in a Y direction and a third accelerometer for detecting acceleration in a Z direction.

In accordance with those same embodiments, the method for logging data onboard an aircraft comprises: moving the mobile device from a location not onboard the aircraft to a location onboard the aircraft; outputting motion data from the motion sensor representing motion of the mobile device; outputting time data from the clock representing times; storing the motion data from the motion sensor and associated time data from the clock in a non-transitory tangible computer-readable storage medium; and processing the data to identify stored motion data representing respective acceleration/deceleration vectors of the mobile device motions that correspond to the OOOI events.

The data processing system of the mobile device may be configured to execute application logic comprising a multiplicity of algorithms for detecting OOOI times (hereinafter "OOOI time detection algorithms"). For example, a single processor may be programmed to execute the multiplicity of OOOI time detection algorithms in sequence. In the alternative, more than one processor may be employed. For example, the data processing system may comprise a multiplicity of processors which process the motion sensor data concurrently, each processor being programmed to execute a respective one of the multiplicity of OOOI time detection algorithms. In accordance with one embodiment, the multiplicity of OOOI time detection algorithms include a first algorithm for detecting a Gate Out time, a second algorithm for detecting a Wheels Off time, a third algorithm for detecting a Wheels On time, and a fourth algorithm for detecting a Gate In time. The first through fourth OOOI time detection algorithms will now be described in some detail with reference to FIGS. 1 through 4.

In accordance with one method for detecting the gate Out time, the first OOOI time detection algorithm comprises a series of instructions executed by the data processing system of the mobile device. Starting at the beginning of the motion data log, the data processing system processes (i.e., searches) the data to identify motion data representing a horizontal acceleration vector of the mobile device that corresponds to aircraft gate departure.

In accordance with one possible implementation, the data processing system uses characteristics of aircraft taxi acceleration or aircraft push back to aid accurate identification of movements of the mobile device corresponding to aircraft gate departure. In addition, the data processing system processes the motion data to filter out motion data representing a vertical acceleration vector of the mobile device that corresponds to movement of the mobile device when the mobile device is not in the cockpit of the aircraft, i.e., the time interval prior to the crew being in the cockpit. Further, the data processing system searches for a time period having associated motion data representing minimal motion of the mobile device to determine when the crew is in the cockpit. More specifically, the data processing system processes the data to identify motion data representing an acceleration vector of the mobile device that corresponds to minimal movement of the mobile device while the mobile device is in the cockpit of the aircraft.

After the data processing system has identified motion data representing the horizontal acceleration corresponding to aircraft gate departure, the data processing system also identifies time data representing a begin time of that horizontal acceleration vector. The data processing system sets a Gate Out time to be equal to that begin time and then stores data representing the Gate Out time in the non-transitory tangible computer-readable storage medium. This Gate Out time corresponds to the "parking brake released" condition set forth by the Federal Aviation Administration in its definitions of OOOI times for ACARS-equipped aircraft.

FIG. 1 is a diagram representing a top view of an aircraft 10 having alternative possible Gate Out movements (indicated by arrows). Arrow 2 indicates a rearward movement of the aircraft 10 during push back from a gate. Arrow 4 indicates that the aircraft 10 first taxis forward and then turns right starting from a stationary position while parked on an apron. Arrow 6 indicates that the aircraft 10 first taxis forward and then turns left starting from a stationary position while parked on an apron. The data processing system is configured to expect that there will be an extended period of time during which the motion data will indicate that the aircraft had no appreciable position change just before the flight plan's departure time. The data processing system is also configured to expect motion data indicating a slow acceleration rate to taxi speeds.

After the data processing system has determined the Gate Out time, it continues to scan the motion data log, searching for an acceleration vector having an upward vertical component that corresponds to aircraft takeoff. More specifically, the data processing system processes the motion data to identify motion data representing an upward vertical acceleration vector of the mobile device that corresponds to aircraft takeoff. The data processing system is configured to expect that the motion data collected during taxiing will have minimal vertical acceleration vectors.

After the data processing system has identified motion data representing the upward vertical acceleration vector of the mobile device that corresponds to aircraft takeoff, the data processing system also identifies time data representing a begin time of that upward vertical acceleration vector. The data processing system sets a Wheels Off time to be equal to that begin time and then stores data representing the Wheels Off time in the non-transitory tangible computer-readable storage medium. This Wheels Off time corresponds to the "air/ground sensor on landing gear set to airborne state" condition set forth by the Federal Aviation Administration in its definitions of OOOI times for ACARS-equipped aircraft.

Optionally, the data processing system may be further configured to calculate a magnitude of an upward vertical displacement of the mobile device subsequent to the begin time of the upward vertical acceleration vector and then determine that the calculated magnitude of the upward vertical displacement of the mobile device exceeds a specified vertical displacement threshold (e.g., 5 feet). In addition, the data processing system may be further configured to calculate a groundspeed of the mobile device (which should be the same as the groundspeed of the aircraft) subsequent to the begin time of the upward vertical acceleration vector and then determine that the calculated groundspeed of the mobile device exceeds a specified groundspeed threshold (e.g., 30 knots). This information can be used to confirm that the detected upward vertical acceleration vector of the mobile device corresponds to aircraft takeoff.

Figure 2:
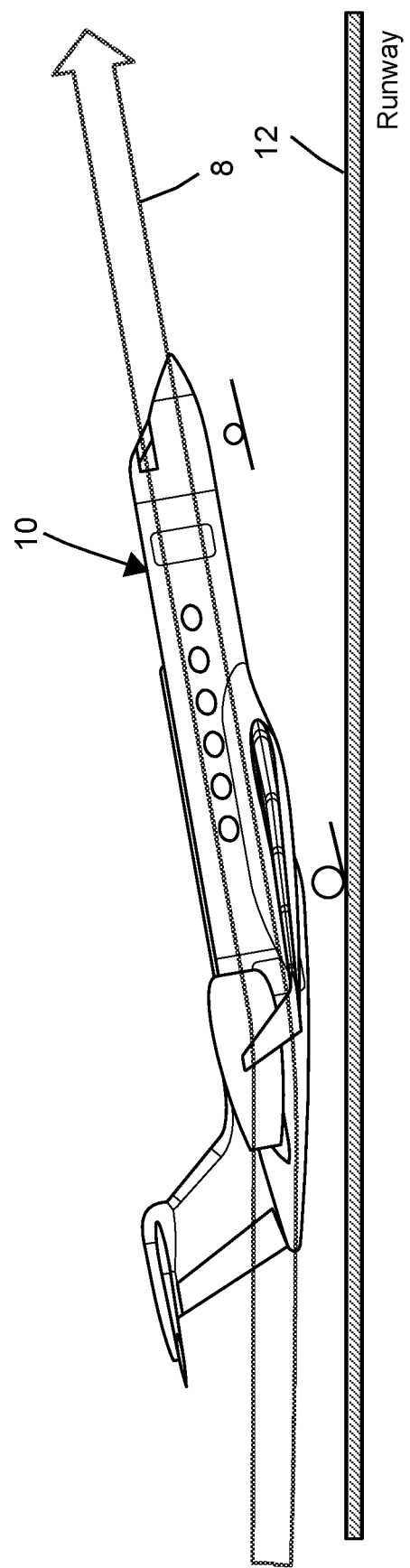
FIG. 2 is a diagram representing a side view of an aircraft taking off, the path of the aircraft during take-off being indicated by an arrow.

FIG. 2 is a diagram representing a side view of an aircraft 10 taking off from a runway 12, the path of the aircraft 10 during take-off being indicated by an arrow 8. For the purpose of determining the Wheels Off time, the data processing system is configured to expect motion data that indicates the following characteristics: (1) start from stop or taxi speed; (2) a sustained high acceleration rate until the groundspeed of the aircraft exceeds 30 knots; (3) a horizontal (only) acceleration vector (i.e., no significant vertical component) only at the beginning; and (4) an upward vertical component of the acceleration vector that starts in the middle of the acceleration vector.

After the data processing system has determined the Wheels Off time, it continues to scan the motion data log, searching for an deceleration vector having a downward vertical component that ends during a deceleration that corresponds to aircraft landing. More specifically, the data processing system processes the motion data to identify motion data representing a downward vertical deceleration vector of the mobile device that corresponds to aircraft landing.

After the data processing system has identified motion data representing the downward vertical deceleration vector of the mobile device that corresponds to aircraft landing, the data processing system also identifies time data representing an end time of that downward vertical deceleration vector. The data processing system sets a Wheels On time to be equal to that end time and then stores data representing the Wheels On time in the non-transitory tangible computer-readable storage medium. This Wheels On time corresponds to the "air/ground sensor on landing gear set to ground state" condition set forth by the Federal Aviation Administration in its definitions of OOOI times for ACARS-equipped aircraft.

Optionally, the data processing system may be further configured to calculate a groundspeed of the mobile device (which should be the same as the groundspeed of the aircraft) subsequent to the end time of the downward vertical deceleration vector and then determine that the calculated groundspeed of the mobile device is less than a specified groundspeed threshold (e.g., 30 knots). This information can be used to confirm that the detected downward vertical deceleration vector of the mobile device corresponds to aircraft landing.

Figure 3:
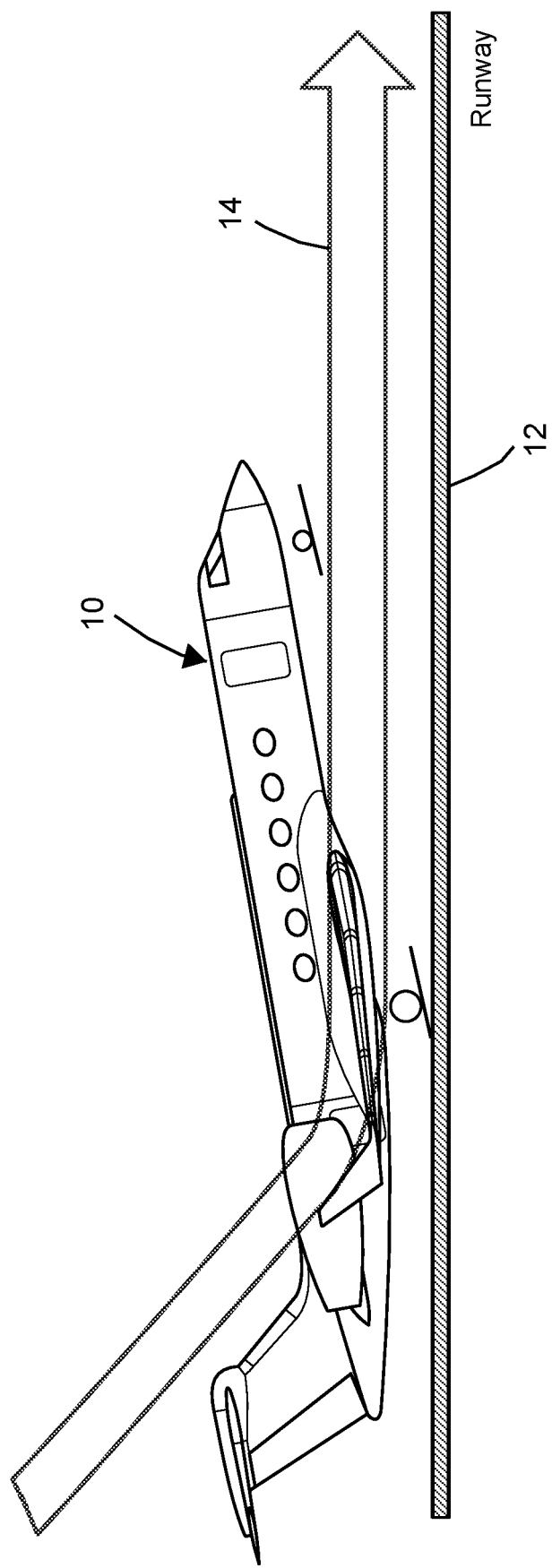
FIG. 3 is a diagram representing a side view of an aircraft landing, the path of the aircraft during landing being indicated by an arrow.

FIG. 3 is a diagram representing a side view of an aircraft 10 landing on a runway 12, the path of the aircraft 10 during landing being indicated by an arrow 14. For the purpose of determining the Wheels On time, the data processing system is configured to expect motion data that indicates the following characteristics: (1) deceleration from cruise speed; (2) the downward vertical component of the deceleration vector ends in middle of deceleration vector; and (3) the end of the downward vertical component of the deceleration vector is followed by a horizontal (only) deceleration vector to taxi speed.

After the data processing system has determined the Wheels On time, it continues to scan the motion data log, searching for a horizontal deceleration vector that corresponds to arriving at the gate. More specifically, the data processing system processes the motion data to identify motion data representing a horizontal deceleration vector of the mobile device that corresponds to aircraft gate arrival.

In accordance with one possible implementation, the data processing system uses characteristics of aircraft taxi deceleration to aid accurate identification of movements of the mobile device corresponding to aircraft gate arrival. In addition, the data processing system processes the logged motion data to filter out motion data representing temporary stops that may occur during taxiing of the aircraft. This can be done by first searching for a time period during which the motion data indicates minimal movement of the mobile device, thereby identifying when the crew is in the cockpit after arriving at the gate. The data processing system is further configured to identify vertical acceleration vectors representing motion of the mobile device as the crew departs the cockpit. After the data processing system has determined when the crew departed the cockpit, the data processing system can then identify the motion data representing the most recent preceding stoppage of the aircraft, thereby eliminating any prior temporary stoppages from the analysis.

After the data processing system has identified motion data representing the horizontal deceleration corresponding to aircraft gate arrival, the data processing system also identifies time data representing an end time of that horizontal deceleration vector. The data processing system sets a Gate In time to be equal to that end time and then stores data representing the Gate In time in the non-transitory tangible computer-readable storage medium. This Gate In time corresponds to the "parking brake is applied" condition set forth by the Federal Aviation Administration in its definitions of OOOI times for ACARS-equipped aircraft.

Figure 4:
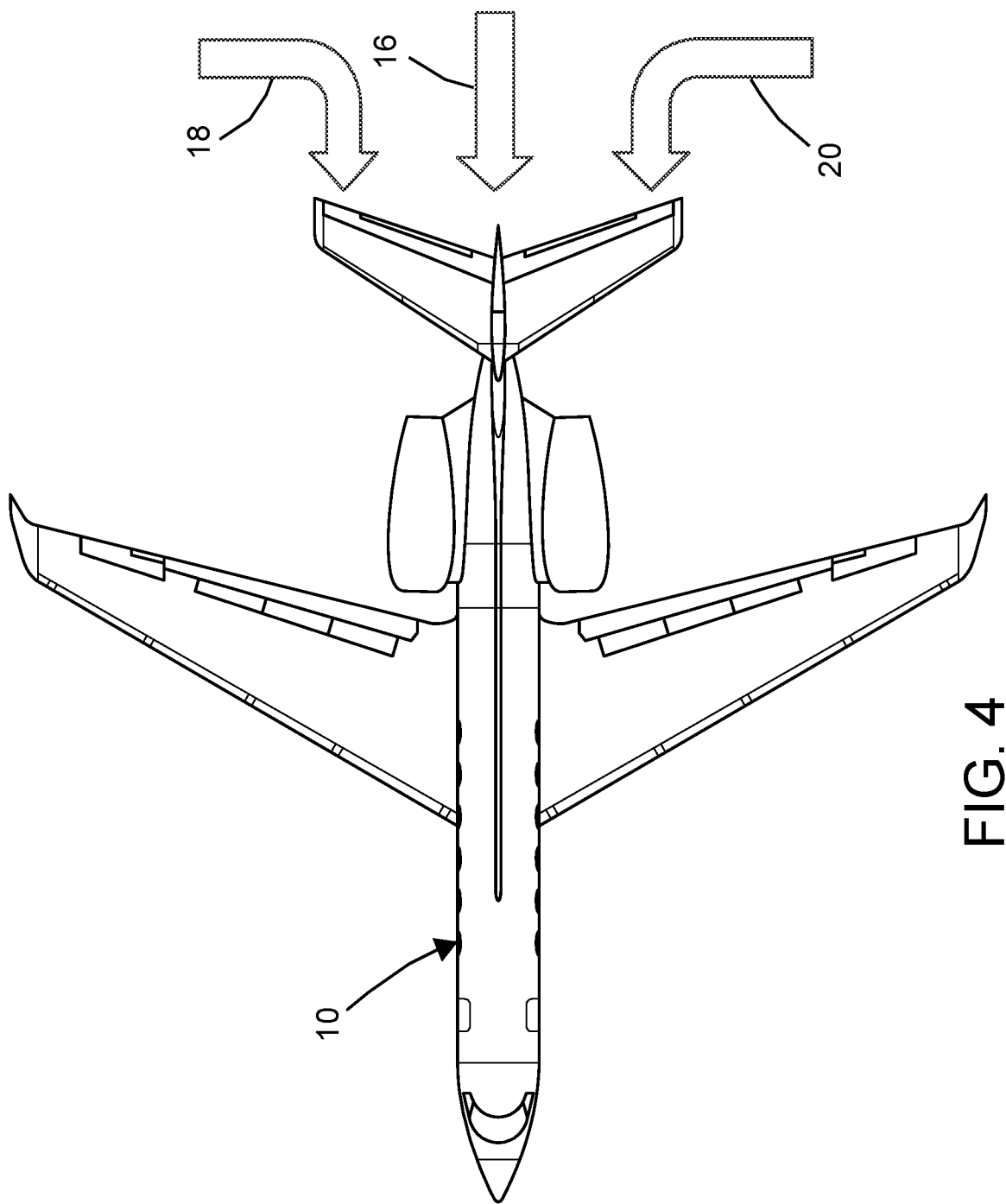
FIG. 4 is a diagram representing a top view of an aircraft having alternative possible Gate In movements (indicated by arrows) to arrive at the parking position depicted.

FIG. 4 is a diagram representing a top view of an aircraft 10 having alternative possible Gate In movements (indicated by arrows). Arrow 16 indicates a direct movement of the aircraft 10 to a gate or a parking stop. Arrow 18 indicates that the aircraft 10 first taxis forward and then turns right and continues moving until the gate or parking spot is reached. Arrow 20 indicates that the aircraft 10 first taxis forward and then turns left moving until the gate or parking spot is reached. The data processing system is configured to search from the end of the motion data log for the last extended time during which the motion data indicates there was no appreciable change in the position of the mobile device. More specifically, the data processing system is configured to search for motion data representing an extended stoppage and collected after other motion data representing the horizontal acceleration vectors associated with taxiing. The data processing system is further configured to filter out stops/holds which occur while the aircraft is taxiing and movements which occur after the crew has departed the cockpit. The data processing system is also configured to expect motion data indicating a slow deceleration rate from taxi speed to a stop.

Following storage of all of the OOOI times in the non-transitory tangible computer-readable storage medium, a block time equal to the Gate In time minus the Gate Out time can be calculated and a flight time equal to the Wheels On time minus the Wheels Off time can be calculated. The data processing system may be configured to calculate the block time and flight time automatically or in response to a manual input by a pilot to the user interface of the mobile device. The data processing system is further configured to store data representing the block time and data representing the flight time in the non-transitory tangible computer-readable storage medium. In addition, the data processing system may be configured to control a display screen of the mobile device to display symbology representing the OOOI times, block time and flight time.

Figure 5:
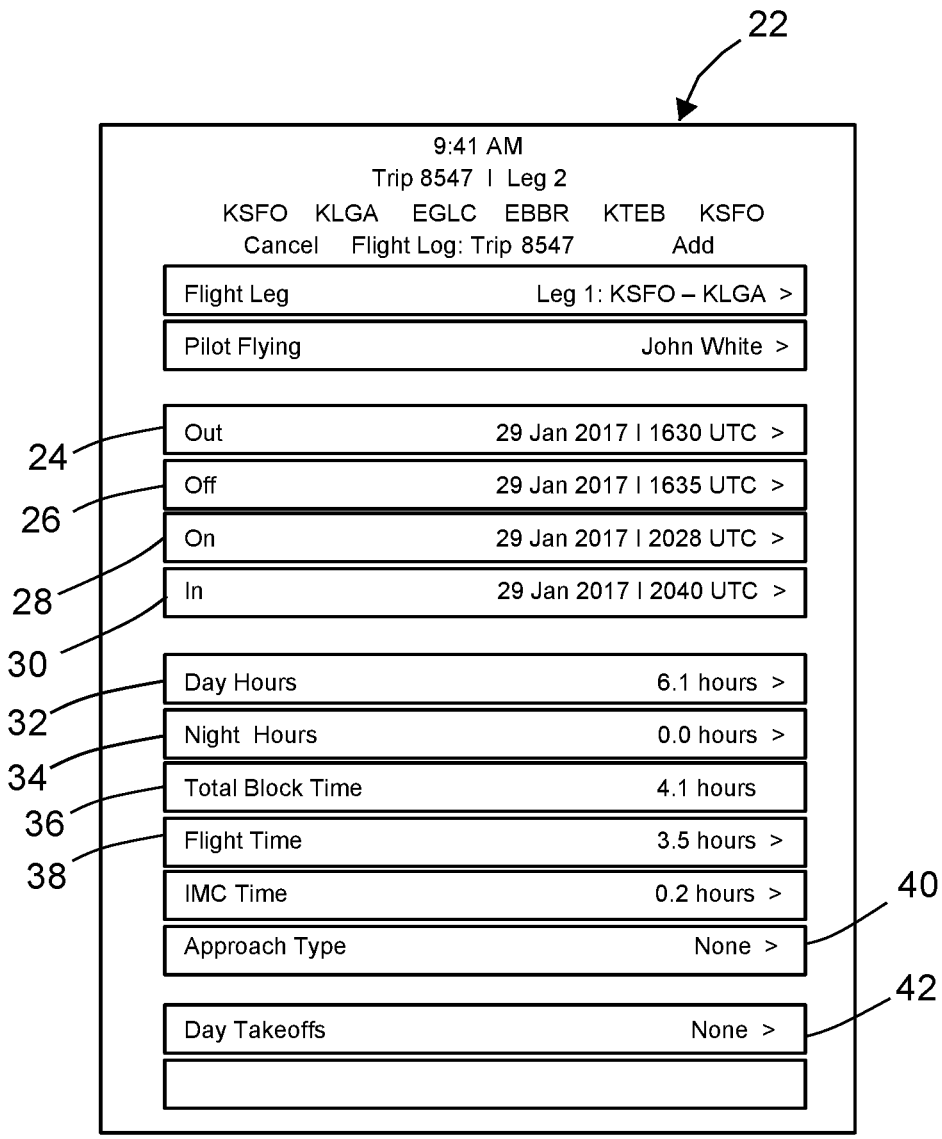
FIG. 5 is a diagram representing a screen mockup for displaying OOOI data on a mobile device.

FIG. 5 is a diagram representing a mockup of a display screen 22 for displaying OOOI data on a mobile device in accordance with one possible implementation. In response to an input by pilot, a graphics processor incorporated in the mobile device can display a multiplicity of data fields arranged in a vertical column. The multiplicity of data fields may comprise the following: a Gate Out time field 24, a Wheels Off time field 26, a Wheels On time field 28, a Gate In time field 30, a Day Hours field 32, a Night Hours field 34, a Total Block Time field 36, a Flight Time field 38, an Approach Type filed 40, and a Day Takeoffs field 42. As previously described, the Gate Out, Wheels Off, Wheels On and Gate In times are determined using the OOOI time detection algorithms. The Day Hours and Night Hours parameters are calculated using sunset/sunrise times. The Total Block Time equals the Gate In time minus the Gate Out time. The Flight Time equals the Wheels On time minus the Wheels Off time. The Approach Type is received from integration with an in-flight application. The Day Takeoffs parameter is calculated using the Wheel Off times and sunset/sunrise times. The same principle can be used to determine the number of night landings. The pilot can modify these calculated values under appropriate circumstances.

Figure 6:
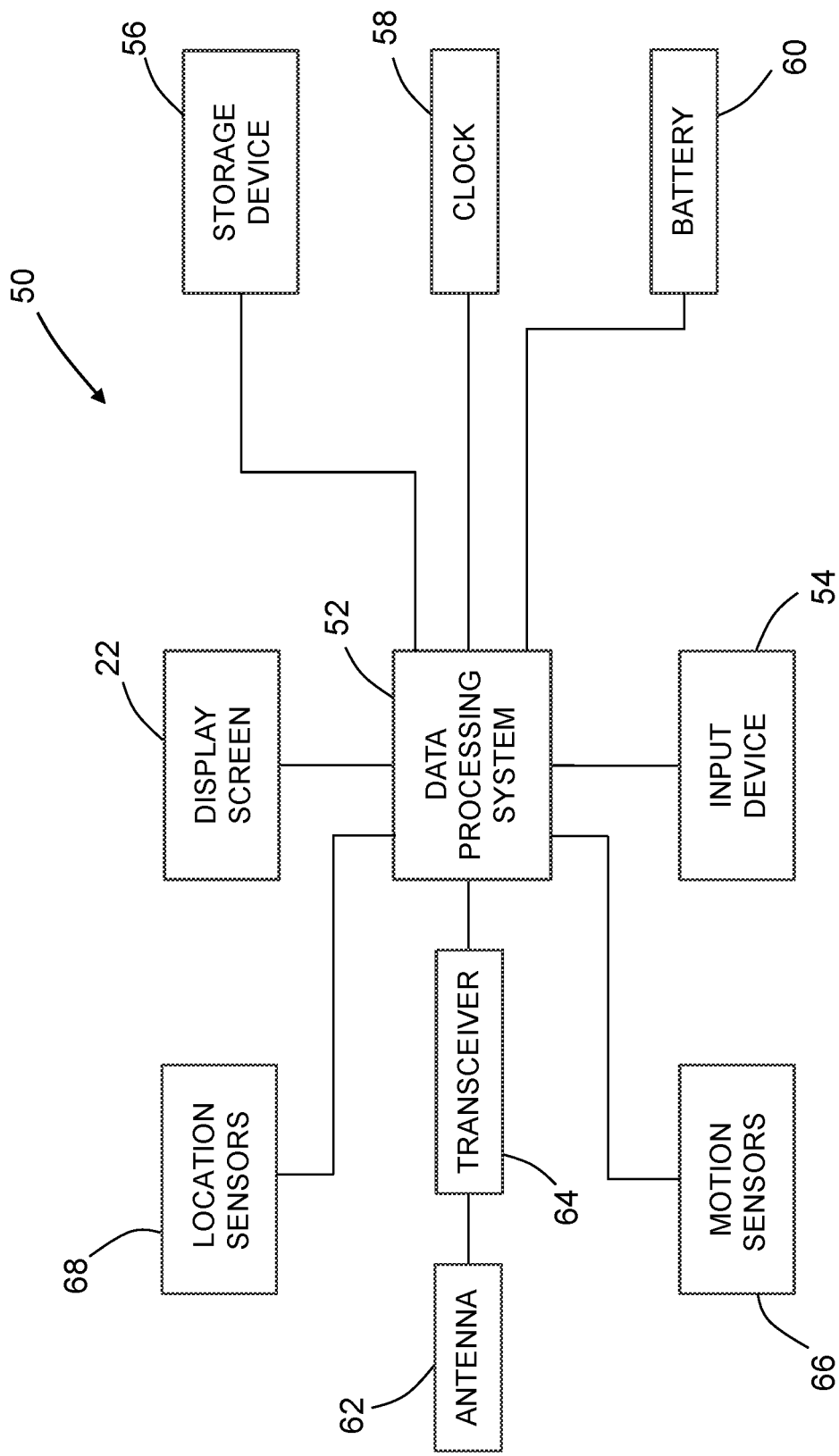
FIG. 6 is a block diagram identifying some components of a mobile device which can be configured to detect and log OOOI data in accordance with the methods disclosed in some detail below.

FIG. 6 is a block diagram identifying some components of a mobile device in accordance with one embodiment, which mobile device can be configured to detect and log OOOI data in accordance with the methods disclosed in some detail below. In this example, the mobile device takes the form of a wireless communications device 50, such as a cellular or mobile telephone, a personal digital assistant, a tablet computer, a laptop computer, a smart watch, a portable display device, or some other suitable type of mobile device. The wireless communications device 50 includes the capability for wireless communication with a ground-based flight operations center.

More specifically, the embodiment of the wireless communications device 50 depicted in FIG. 6 comprises: an antenna 62; a radio frequency transceiver 64 coupled to the antenna 62 to transmit and/or receive voice and/or digital data signals through the antenna 62; and a digital data processing system 52 (hereinafter "data processing system 52") to control the transceiver 64 and to manage the voice and digital data signals. The data processing system 52 may be a general-purpose processing device, such as a microprocessor or controller for example. Digital processing system 52 may also be a special-purpose processing device, such as an application specific integrated circuit (ASIC), a field-programmable gate array (FPGA) or a digital signal processor (DSP). The wireless communications device 50 further comprise a non-transitory tangible computer-readable storage medium in the form of a storage device 56, which is communicatively coupled to the data processing system 52 and which stores data and/or operating programs. Storage device 56 may, for example, be a solid-state or magnetic memory device. The wireless communications device 50 also comprises an input device 54, which is communicatively coupled to the data processing system 52 and which accepts user inputs. The input device 54 may, for example, be a keypad, a touchpad, a touch screen, a pointing device in combination with a display device or a similar input device. The wireless communications device 50 also comprises a display screen 22 of the type depicted in FIG. 5. The display screen 22 is communicatively coupled to the data processing system 52 to display information as previously described. The display device 22 may, for example, be an LCD display device. The input device 54 and display device 22 may be integrated together in a well-known manner. The wireless communications device 50 also comprises a battery 60 for supplying electrical power to the other components of the system. The battery 60 may, for example, be a rechargeable or non-rechargeable lithium or nickel metal hydride battery. The wireless communications device 50 may also include an audio transducer (e.g., a speaker) and a microphone (not shown).

The wireless communications device 50 further comprises motion sensors 66 for detecting motion of the device. In accordance with one implementation, the motion sensors 66 are a three-axis MEMS-based accelerometer, a three-axis MEMS-based gyro, and a barometer. According to one embodiment, the motion sensors 66 are able to detect a movement including an acceleration or de-acceleration of the wireless communications device 50. The motion sensors 66 may generate motion data for multiple dimensions, which may be used to determine a direction of movement of the wireless communications device 50. For example, the motion sensors 66 may generate X, Y and Z axis acceleration information when the motion sensors 66 detects that the wireless communications device 50 is moving.

In addition, the data processing system 52 is coupled to the motion sensor 66 and configured to calculate a direction of movement of the wireless communications device 50. The movement vector may be determined according to one or more predetermined formulas based on the movement data (e.g., movements in X, Y and Z directions) provided by the motion sensors 66. The motion sensors 66 may continuously monitor the movement of the wireless communications device 50.

Further, the wireless communications device 50 may comprise locations sensors 68 for providing location data of the device. In accordance with one implementation, the location sensors 68 are a digital compass, GPS, GLONASS, Wi-Fi location, and beacon micro-location. According to one embodiment, the location sensors 68 provide location data for the wireless communication device 50.

In addition, the data processing system 52 is coupled to the location sensors 68 and configured to process and record location data. When available, location data may be used to improve the accuracy or efficiency of this method.

Lastly, the wireless communications device 50 further comprises a clock 58 that may be synchronized with a GPS time signal (the GPS receiver is part of the location sensors 68). The time data output by the clock 58 is used by the data processing system 52 to time stamp the motion data received from the motion sensor 66 when that motion data is stored in the storage device 56.

The above-described mobile device for providing a retrievable record of OOOI times can be enhanced with additional capabilities by integration with other systems. When integrated with aircraft avionics, the mobile device can calculate Hobbs time, fuel burns and fuel uplift, which are otherwise estimated from the flight plan. Also ACARS or aircraft Wi-Fi would allow near real-time updates of aircraft-measured OOOI times for comparison with the OOOI times from this method. GPS data can be used to improve the accuracy of detecting OOOI times either from aircraft integration or from third-party antennas or GPS when combined with airport and runway location data from integration with other applications. The GPS signals can be used to determine the location of the mobile device at the gate and on the runway, and provide enhanced location and speed information. In-flight application integration can provide information about the approach procedure (initially need the type), the locations of gates and runways used for the trip to aid the use of GPS data, and the flight plan to avoid manual reentry in the in-flight application.

While devices and methods for providing a retrievable record of the OOOI times for actual aircraft movements have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The embodiments of a mobile device for logging OOOI times disclosed above may incorporate one or more computers or processors. As used in the claims, the term "data processing system" means a computer system comprising one or more computers and/or one or more processors. As previously described, each processor may be a microprocessor, a digital signal processor, a FPGA, an ASIC, or any other circuit or processing device capable of executing one or more of the functions described herein.

The methods described herein may be encoded as executable instructions embodied in a non-transitory tangible computer-readable storage medium, including, without limitation, a persistent storage device and/or a persistent memory device. Such instructions, when executed by a computing system, cause the mobile device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for logging data onboard an aircraft during takeoff using a mobile device, the method comprising:
   (a) outputting motion data from a motion sensor incorporated in the mobile device during takeoff;
   (b) outputting time data from a clock incorporated in the mobile device representing times during takeoff;
   (c) storing the motion data from the motion sensor and associated time data from the clock in a non-transitory tangible computer-readable storage medium incorporated in the mobile device during takeoff;
   (d) searching the motion data for motion data representing an upward vertical acceleration vector;
   (e) detecting motion data representing the upward vertical acceleration vector during the searching;
   (f) identifying time data representing a begin time of the upward vertical acceleration vector;
   (g) calculating at least one parameter relating to movement of the mobile device subsequent to the begin time to confirm that the detected upward vertical acceleration vector of the mobile device corresponds to aircraft takeoff;
   (h) setting a Wheels Off time to be equal to the begin time in response to confirmation that the detected upward vertical acceleration vector of the mobile device corresponds to aircraft takeoff; and
   (i) storing data representing the Wheels Off time in the non-transitory tangible computer-readable storage medium,
   wherein steps (d) through (h) are performed by a data processing system incorporated in the mobile device.

2. The method as recited in claim 1, wherein the calculating step comprises:
   calculating a magnitude of an upward vertical displacement subsequent to the begin time of the upward vertical acceleration vector; and
   determining that the magnitude of the upward vertical displacement exceeds a specified vertical displacement threshold.

3. The method as recited in claim 2, wherein the calculating step further comprises:
   calculating a groundspeed of the aircraft subsequent to the begin time of the upward vertical acceleration vector; and
   determining that the calculated groundspeed of the aircraft exceeds a specified groundspeed threshold.

4. The method as recited in claim 1, further comprising:
   outputting motion data from the motion sensor during landing;
   outputting time data from the clock representing times during landing;
   storing the motion data from the motion sensor and associated time data from the clock in the non-transitory tangible computer-readable storage medium during landing;

searching the stored motion data for motion data representing a downward vertical deceleration vector of the mobile device that corresponds to aircraft landing;
detecting motion data representing the downward upward vertical acceleration vector during the searching;
identifying time data representing an end time of the downward vertical deceleration vector;
calculating at least one parameter relating to movement of the mobile device subsequent to the end time to confirm that the detected downward vertical acceleration vector of the mobile device corresponds to aircraft takeoff;
setting a Wheels On time to be equal to the end time in response to confirmation that the detected downward vertical acceleration vector of the mobile device corresponds to aircraft landing; and
storing data representing the Wheels On time in the non-transitory tangible computer-readable storage medium.

5. The method as recited in claim 4, further comprising:
calculating a flight time equal to the Wheels On time minus the Wheels Off time; and
storing data representing the flight time in the non-transitory tangible computer-readable storage medium.

6. The method as recited in claim 4, further comprising displaying symbology representing the Wheels On time and the Wheels Off time.

7. The method as recited in claim 4, wherein the calculating step comprises:
calculating a groundspeed of the aircraft subsequent to the end time of the downward vertical deceleration vector; and
determining that the calculated groundspeed of the aircraft is less than a specified groundspeed threshold.

8. A mobile device for logging data onboard an aircraft, comprising:
a motion sensor configured to output motion data;
a clock that outputs time data representing times;
a non-transitory tangible computer-readable storage medium for storing motion data from the motion sensor and associated time data from the clock; and
a data processing system configured to perform the following operations:
searching the stored motion data for motion data representing an upward vertical acceleration vector;
detecting motion data representing the upward vertical acceleration vector during the searching;
identifying stored time data representing a begin time of the upward vertical acceleration vector;
calculating at least one parameter relating to movement of the mobile device subsequent to the begin time to confirm that the detected upward vertical acceleration vector of the mobile device corresponds to aircraft takeoff;
setting a Wheels Off time to be equal to the begin time in response to confirmation that the detected upward vertical acceleration vector of the mobile device corresponds to aircraft takeoff; and
sending data representing the Wheels Off time to the non-transitory tangible computer-readable storage medium for storage.

9. The mobile device as recited in claim 8, wherein the data processing system is further configured to perform the following operations:
searching the stored motion data for motion data representing a downward vertical deceleration vector of the mobile device that corresponds to aircraft landing;
detecting motion data representing the downward upward vertical acceleration vector during the searching;
identifying time data representing an end time of the downward vertical deceleration vector;
calculating at least one parameter relating to movement of the mobile device subsequent to the end time to confirm that the detected downward vertical acceleration vector of the mobile device corresponds to aircraft takeoff;
setting a Wheels On time to be equal to the end time in response to confirmation that the detected downward vertical acceleration vector of the mobile device corresponds to aircraft landing; and
sending data representing the Wheels On time to the non-transitory tangible computer-readable storage medium for storage.

10. The mobile device as recited in claim 9, further comprising a display screen, wherein the data processing system is further configured to control the display screen to display symbology representing the Wheels Off time and the Wheels On time.

11. A method for logging data onboard an aircraft during landing using a mobile device, the method comprising:
(a) outputting motion data from a motion sensor incorporated in the mobile device during landing;
(b) outputting time data from a clock incorporated in the mobile device representing times during landing;
(c) storing the motion data from the motion sensor and associated time data from the clock in a non-transitory tangible computer-readable storage medium incorporated in the mobile device during landing;
(d) searching the stored motion data for motion data representing a downward vertical deceleration vector of the mobile device that corresponds to aircraft landing;
(e) detecting motion data representing the downward upward vertical acceleration vector during the searching;
(f) identifying time data representing an end time of the downward vertical deceleration vector;
(g) calculating at least one parameter relating to movement of the mobile device subsequent to the end time to confirm that the detected downward vertical acceleration vector of the mobile device corresponds to aircraft takeoff;
(h) setting a Wheels On time to be equal to the end time in response to confirmation that the detected downward vertical acceleration vector of the mobile device corresponds to aircraft landing; and
(i) storing data representing the Wheels On time in the non-transitory tangible computer-readable storage medium,
wherein steps (d) through (h) are performed by a data processing system incorporated in the mobile device.

12. The method as recited in claim 11, further comprising displaying symbology representing the Wheels On time.

13. The method as recited in claim 11, wherein the calculating step comprises:
calculating a groundspeed of the aircraft subsequent to the end time of the downward vertical deceleration vector; and
determining that the calculated groundspeed of the aircraft is less than a specified groundspeed threshold.

14. A mobile device for logging data onboard an aircraft, comprising:
a motion sensor configured to output motion data;
a clock that outputs time data representing times;

a non-transitory tangible computer-readable storage medium for storing motion data from the motion sensor and associated time data from the clock; and a data processing system configured to perform the following operations:

searching the stored motion data for motion data representing a downward vertical deceleration vector of the mobile device that corresponds to aircraft landing;

detecting motion data representing the downward upward vertical acceleration vector during the searching;

identifying time data representing an end time of the downward vertical deceleration vector;

calculating at least one parameter relating to movement of the mobile device subsequent to the end time to confirm that the detected downward vertical acceleration vector of the mobile device corresponds to aircraft takeoff;

setting a Wheels On time to be equal to the end time in response to confirmation that the detected downward vertical acceleration vector of the mobile device corresponds to aircraft landing; and sending data representing the Wheels On time to the non-transitory tangible computer-readable storage medium for storage.

15. The mobile device as recited in claim 14, further comprising a display screen, wherein the data processing system is further configured to control the display screen to display symbology representing the Wheels Off time and the Wheels On time.

\* \* \* \* \*